United States Patent
DeHart

(10) Patent No.: US 7,232,085 B2
(45) Date of Patent: Jun. 19, 2007

(54) DIVERTER AND CHOPPER VALVE FOR AN AIR CONVEYED CONTINUOUS STRIP OF MATERIAL

(75) Inventor: Robert W. DeHart, Mason, OH (US)

(73) Assignee: Airtrim, Inc., Springfield, OH (US)

( * ) Notice: Subject to any disclaimer, the term of this patent is extended or adjusted under 35 U.S.C. 154(b) by 428 days.

(21) Appl. No.: 10/974,159

(22) Filed: Oct. 27, 2004

(65) Prior Publication Data

US 2006/0086844 A1  Apr. 27, 2006

(51) Int. Cl.
*B02C 17/14* (2006.01)
(52) U.S. Cl. .................... 241/264; 241/46.13
(58) Field of Classification Search ............... 241/264, 241/46.13, 46.06
See application file for complete search history.

(56) References Cited

U.S. PATENT DOCUMENTS

| | | | | |
|---|---|---|---|---|
| 3,682,115 | A | * | 8/1972 | Rodgers ............... 110/222 |
| 3,959,897 | A | * | 6/1976 | May ..................... 37/319 |
| 4,398,669 | A | * | 8/1983 | Fienhold ............... 239/447 |
| 4,700,899 | A | * | 10/1987 | Powers et al. ........ 241/30 |
| 5,265,547 | A | | 11/1993 | Daws |
| 6,182,699 | B1 | | 2/2001 | Hawkes |

OTHER PUBLICATIONS

Laser Quick-Fit Diverter Valve By NORDFAB, Catalog, p. 15.

* cited by examiner

*Primary Examiner*—Bena Miller
(74) *Attorney, Agent, or Firm*—Jacox, Meckstroth & Jenkins

(57) ABSTRACT

A diverter valve housing has two outlets and one inlet for receiving a flow of air conveying a continuous strip of material, and a diverter duct or tube is pivotally supported within the housing on a pivot axis adjacent the inlet. The diverter tube has an outlet end portion supporting a pair of inclined cutting blades which cooperate with a cutting blade supported by the housing between the outlets for alternately and quickly chopping or cutting the strip of material when the outlet end portion of the diverter tube pivots between the two outlets of the housing. Sealing members connect the diverter tube to the housing and form stops for the diverter tube. A fluid cylinder is pivotally connected to the housing and has a piston rod pivotally connected to the diverter tube for rapidly pivoting the diverter tube between the two outlets.

20 Claims, 2 Drawing Sheets

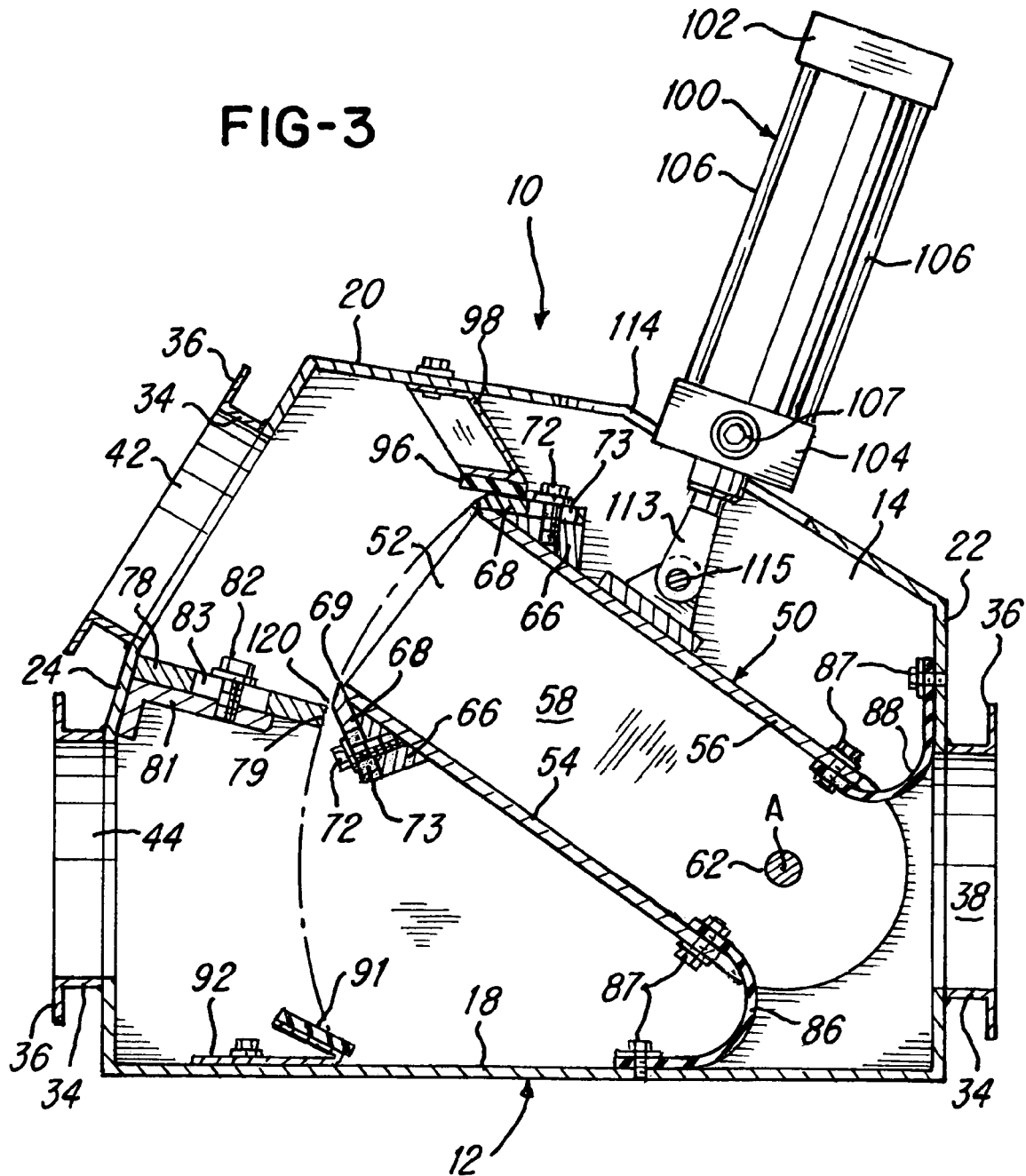

DIVERTER AND CHOPPER VALVE FOR AN AIR CONVEYED CONTINUOUS STRIP OF MATERIAL

BACKGROUND OF THE INVENTION

In a duct system for pneumatically conveying a continuous web or strand or strip of material, herein collectively referred to as strip of material, such as the edge trim from a web of paper or plastic sheet or film or the carrier or backer strip for adhesive labels, it is frequently desirable to divert the air conveyed continuous strip of material with a diverter valve between a first duct and a second duct. For example, the air conveyed continuous strip may be transferred or diverted between a first duct connected to a compacter or grinder or shredder and a second duct connected to a baler or pulper or a winder, all commonly used for either recycling or disposing of the material. It is also desirable for the continuously supplied strip material to be diverted on the fly or without stopping the flow of material and without jamming the diverter valve. Thus it is desirable for the diverter valve to operate quickly and to cut or chop the continuously supplied strip of material without any significant restriction to the flow of the strip material in order to prevent the material from collecting within the diverter valve or jamming the valve. In view of the many applications of diverter valves, it is also desirable for a diverter valve to operate in any orientation.

While diverter valves are well known in the prior art, for example, such as the valves disclosed in U.S. Pat. Nos. 5,265,547 and 6,182,699, and the diverter valves sold by Nordfab in Thomasville, N.C. under the trademark LASER-QUICK FIT, such diverter valves are used for diverting fluids or fluids conveying small pieces of material and are not effective for diverting an air conveyed continuously supplied strip of material without stopping the continuous flow of the strip and without jamming the diverter valve.

SUMMARY OF THE INVENTION

The present invention is directed to a diverter and chopper valve which is ideally suited for diverting a pneumatically conveyed continuous strip of material from one duct to another duct and without interrupting or restricting the continuous flow of the strip of material and without jamming the diverter valve. Thus the diverter and chopper valve of the invention provides all of the desirable advantages mentioned above and, in general, includes a housing having an air inlet and two air outlets. The housing encloses a diverter member for directing an air conveyed continuous strip of material from the inlet to either of the outlets and for quickly cutting or chopping the strip of material when the air flow is diverted from one outlet to the other outlet.

In accordance with one embodiment of the invention, a fabricated metal housing has parallel spaced side walls connected by transverse walls which define an air inlet on one end and two air outlets on the opposite end. A tubular diverter member or duct is enclosed within the housing and has parallel spaced side walls adjacent the side walls of the housing. The side walls of the diverter duct are connected by parallel spaced transverse walls and define a passage having a generally square cross-sectional configuration. The side walls of the diverter member or duct are pivotally supported with a pivot axis adjacent the air inlet, and an outlet end portion of the diverter duct carries a pair of adjustable and converging cutting or chopping blades mounted on the transverse walls of the diverter duct. A fixed cutting blade is adjustably supported by the housing between the two air outlets and cooperates with the cutting blades on the diverter duct to chop or cut a continuous strip of material when the diverter duct pivots back and forth between the two air outlets. Flexible sealing members or sheets connect the inlet of the diverter duct to the housing, and resilient members or pads form seals between the outlet end portion of the diverter duct and the housing after the diverter duct pivots to one of the outlets in response to actuation of a fluid cylinder connecting the housing to the diverter duct.

Other features and advantages of the invention will be apparent from the following description, the accompanying drawings and the appended claims.

BRIEF DESCRIPTION OF THE DRAWINGS

FIG. 3 is a section through the valve, taken generally on the line 3—3 of FIG. 1

DESCRIPTION OF THE PREFERRED EMBODIMENT

Figure 1:
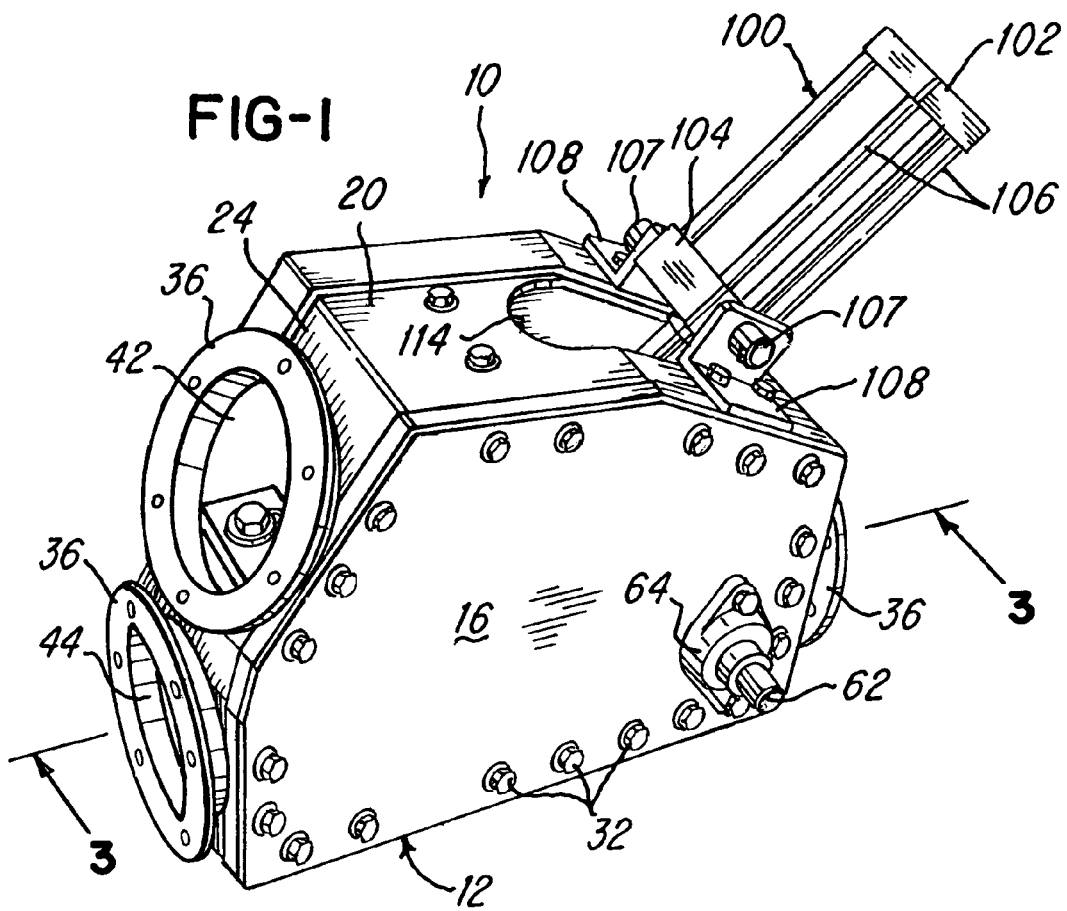
FIG. 1 is a perspective view of a diverter and chopper valve constructed in accordance with the invention.

FIG. 1 illustrates a diverter and chopper valve 10 constructed in accordance with the invention and including a fabricated sheet metal housing 12 having parallel spaced side walls 14 (FIG. 3) and 16 (FIG. 1), with the side wall 16 also forming a removable access panel. The side walls 14 and 16 are rigidly connected by laterally extending transverse walls including a flat bottom wall 18 (FIG. 3), an angular top wall 20 and opposite end walls 22 and 24. An inwardly projecting peripheral flange 26 (FIG. 2) is rigidly connected to the walls 18, 20, 22 and 24 and has peripherally spaced threaded holes 28 for receiving corresponding machine screws 32 (FIG. 1) for removably securing the side wall 16 to the transverse walls.

A cylindrical metal collar or neck 34 (FIG. 3) is secured or welded to the end wall 22 and has an outwardly projecting circular flange 36. The neck 34 defines a cylindrical air inlet 38, and the flange 36 is adapted to be connected to a mating flange on a pneumatic conveyor duct (not shown) which supplies a continuous strip of material carried by the air flow into the air inlet 38. Another pair of cylindrical collars or necks 34 with corresponding outwardly projecting flanges 38 are rigidly connected or welded to the angular end wall 24 of the housing 12 and define a first cylindrical air outlet 42 and a second cylindrical air outlet 44. The circular flanges 36 surrounding the outlets 42 and 44 are adapted to be connected to mating flanges on corresponding air conveyor ducts (not shown) which extend to certain processing equipment for the strip of material as mentioned above.

A diverter member 50 in the form of a tube or duct, is enclosed within the housing 12, and in the form illustrated, includes parallel spaced side walls 52 rigidly connected by parallel spaced transverse or connector walls 54 and 56. The walls 52, 54 and 56 form a tubular diverter member having generally a square cross-sectional configuration and defining an internal passage 58. Each of the side walls 52 of the tubular diverter member or duct 50 is welded to a corresponding shaft 62, and the aligned shafts project outwardly into corresponding bearings 64 mounted on the side walls 14 and 16 of the housing 12. The shafts 62 and bearings 64 support the diverter member or duct 50 for pivotal movement on an axis A adjacent the air inlet 38.

Figure 2:
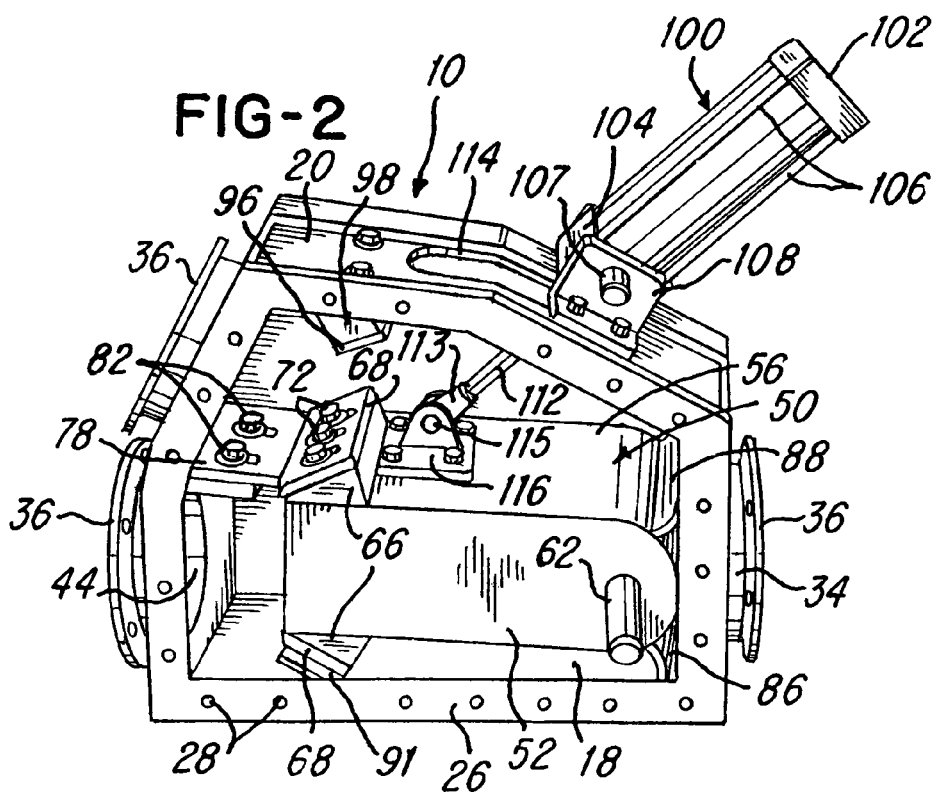
FIG. 2 is another perspective view of the diverter and chopper valve with a side access plate removed to show internal construction.

A pair of triangular blocks 66 are attached or welded to the outer end portions of the walls 54 and 56 of the diverter member 50, and each block 66 supports a cutting or chopping knife or blade 68 having a sharp cutting edge 69. Each blade is adjustably secured by a set of screws 72 extending through corresponding slots 73 within the blade 68. Each blade 68 extends between the side walls 14 and 16 of the housing 12 with slight clearance between the ends of the blades and the side walls. A fixed cutting or chopping knife or blade 78 has a cutting edge 79 and is supported by the housing 12 through an L-shaped bracket 81 secured or welded to the end wall 24 of the housing between the air outlets 42 and 44. A pair of screws 82 extend through slots 83 within the blade 78 and are threaded into the bracket 81 for adjustably securing the blade 78 to the bracket 81. As shown in FIG. 2, the fixed blade 78 also extends between the side walls 14 and 16 of the housing 12.

A flexible and resilient sealing member or sheet 86 extends between the wall 54 of the tubular diverter member or duct 50 and the wall 18 of the housing 12 and is secured by screws 87 to form a flexible seal between the diverter duct and the housing. A similar flexible and resilient sealing member or sheet 88 extends between the wall 56 of the diverter duct 50 and the end wall 22 of the housing and is secured by another set of screws 87 to form a flexible seal between the diverter member and the housing 12. A resilient stop pad 91 extends between the side walls 14 and 16 of the housing 12 and is supported by a V-shaped or angular bracket 92 secured to the housing wall 18. The pad 91 forms a resilient stop for the lower cutting blade 68 (FIG. 3) and also forms a fluid-tight seal between the blade and the housing when the diverter duct 50 pivots downwardly to the position shown in FIG. 2. Another resilient pad 96 extends between the walls 14 and 16 of the housing 12 and is supported by a box-like angular bracket 98 secured to the wall 20 of the housing 12. As shown in FIG. 3, the resilient pad 96 forms both a resilient stop and cooperates with the bracket 98 to form a fluid-tight seal between the cutting blade 68 and the housing when the diverter duct 50 is pivoted to the upper position shown in FIG. 3.

The diverter member or duct 50 is pivoted on the axis A between the position shown in FIG. 3 where the duct 50 generally aligns with the air outlet 42 and the position shown in FIG. 2 where the duct 50 generally aligns with the air outlet 44. This pivoting movement is produced by a double acting fluid or air cylinder 100 having end blocks 102 and 104 connected by tie rods 106. The end block 104 is pivotally supported by aligned screws 107 extending through corresponding L-shaped support brackets 108 mounted on the wall 20 of the housing 12. The fluid cylinder 100 includes a piston rod 112 (FIG. 2) having an end fitting 113 which projects through a slot 114 in the wall 20 of the housing. The fitting 113 is pivotally connected by a cross-pin 115 to a bracket 116 secured to the wall 56 of the diverter duct 50. Thus when the cylinder 100 is actuated to extend and retract the piston rod 112, the diverter member or duct 50 is quickly pivoted between the two positions shown in FIGS. 2 and 3.

In operation, a continuous strip of material is carried by a flow of air directed into the air inlet 38 of the valve 10 and enters the inlet end of the diverter member or duct 50. The duct 50 directs the air flow and continuous strip of material to the air outlet 42 which is connected by a duct to a first machine for processing the continuous strip of material. When it is desired to divert the air flow and the continuous strip of material to a different strip processing machine connected by a duct to the air outlet 44, the fluid cylinder 100 is actuated to pivot the diverter member or duct 50 quickly to the position shown in FIG. 2. During the rapid movement of the diverter duct 50, the upper blade 68 (FIG. 3) cooperates with the fixed blade 78 to cut or chop the continuous strip of material which then continues to flow through the diverter duct 50 and out through the air outlet 44.

A small gap 120 (FIG. 3) is provided between each of the blades 68 and the blade 78 after the diverter tube 50 is pivoted to provide sufficient air flow to carry the trailing end of the continuous strip of material through the duct connected to the air outlet 42 or 44. When the diverter member or duct 50 is pivoted back from the position shown in FIG. 2 to the position shown in FIG. 3 by actuation of the cylinder 100, the continuous strip of material is again severed or chopped between the lower blade 68 (FIG. 3) and the fixed blade 78, whereby the diverting operation of the continuous strip of material is repeated. As mentioned above, the resilient pads 91 and 96 form stops for the pivotal movement of the diverter duct 50, and the brackets 92 and 98 cooperate with the pads and the flexible seals 86 and 88 to prevent a flow of air through the housing 12 except through the passage 58 of the diverter member or duct 50.

From the drawings and the above description, it is apparent that a diverter and chopper valve constructed in accordance with the invention provides desirable features and advantages. That is, while a continuous strip of material is being pneumatic conveyed into the air inlet 38 and through the diverter duct 50 and through one of the air outlets 42 or 44, the conveyor air and continuous strip may be quickly transferred from the one air outlet to the other air outlet by quickly pivoting the diverter duct 50 in response to actuation of the air cylinder 100. During the transfer, one of the chopping blades 68 cooperates with the stationary chopping blade 78 to sever the continuous strip of material which then continues to travel with the flow of air through the air outlet aligned with the passage 58 of the diverter duct 50.

The chopping blades 68 and 78 may also be precisely adjusted and easily removed for sharpening after the side wall or cover plate 16 is removed. The flexible sheet seals 86 and 88 also assure that the flow of air and carrying the continuous strip of material flow into the passage 58 of the diverter duct 50. The resilient pads 91 and 96 cushion the rapid movement of the diverter tube and cooperate with the corresponding brackets 92 and 98 to assure that the air and continuous strip of material continues to flow through the air outlet aligned with the passage 58.

As also apparent, the chopping or cutting of the continuous strip of material is performed when the diverter duct 50 is pivoting close to the end of its stroke so that the continuous strip of material is cut on the fly and there is no jamming of the cutting blades or collection of the leading end of the continuous strip of material within the housing 12. As another advantage, the diverter and chopper valve 10 may be operated in any orientation depending on the positions of the air conveying ducts.

While the form of valve apparatus herein described and its method of operation constitute a preferred embodiment of the invention, it is to be understood that the invention is not limited to the precise form of apparatus and method described, and that changes may be made therein without departing from the scope and spirit of the invention as defined in the appended claims.

What is claimed is:

1. A diverter and chopper valve for a fluid conveyed continuous strip of material, comprising a housing having a fluid inlet and a first fluid outlet and a second fluid outlet, said inlet adapted to receive a continuous flow of fluid conveying a continuous strip of material, a moveable diverter member defining a passage and supported within said housing for movement between a first position directing the flow of fluid and continuous strip of material from said inlet to said first outlet and a second position directing the flow of fluid and the continuous strip of material from said inlet to said second outlet, a first strip cutting element supported by said housing and a second strip cutting element carried by said diverter member, and said first and second cutting elements cooperate to cut the strip in response to movement of said diverter member from said first position to said second position.

2. A valve as defined claim 1 wherein said housing includes parallel spaced side walls, and said diverter member includes parallel spaced side walls supported adjacent said side walls of said housing for pivotal movement between said first and second positions.

3. A valve as defined claim 1 wherein said diverter member carries two spaced said cutting elements supported with said passage in-between for cutting the strip in response to movement of said diverter member back and forth between said first and second positions.

4. A valve as defined claim 1 wherein said diverter member is supported for pivotal movement with an axis adjacent said fluid inlet, and said first strip cutting element is supported by said housing between said first fluid outlet and said second fluid outlet.

5. A valve as defined claim 1 wherein said diverter member is pivotally supported on an axis adjacent said fluid inlet, and sealing members connecting said diverter member to said housing.

6. A valve as defined claim 1 wherein said diverter member is tubular and has generally parallel spaced side walls and generally parallel spaced connector walls connecting said side walls to define a passage, said side walls and said connector walls define an outlet end for said diverter member, and a pair of cutting blades mounted on said connector walls adjacent said outlet end of said diverter member.

7. A valve as defined claim 6 wherein said tubular diverter member is pivotally supported with a pivot axis adjacent said fluid inlet, and said first cutting element comprises a cutting blade supported by said housing between said first and second fluid outlets.

8. A valve as defined claim 7 and including flexible sealing members connecting said diverter member to said housing adjacent said fluid inlet.

9. A valve as defined claim 6 and including resilient stop members supported by said housing for alternating stopping movement of said tubular diverter member.

10. A diverter and chopper valve for a fluid conveyed continuous strip of material, comprising a housing having a fluid inlet and a first fluid outlet and a second fluid outlet, said inlet adapted to receive a continuous flow of fluid conveying a continuous strip of material, a tubular diverter duct defining a passage and supported within said housing for pivotal movement between a first position directing the flow of fluid and continuous strip of material from said inlet to said first outlet and a second position directing the flow of fluid and the continuous strip of material from said inlet to said second outlet, a first strip cutting element supported by said housing, a set of second strip cutting elements mounted on an end portion of said diverter duct, and said first and second cutting elements cooperate to cut the strip of material in response to pivoting of said diverter duct between said first position and said second position.

11. A valve as defined claim 10 wherein said housing includes parallel spaced side walls, and said diverter duct includes parallel spaced side walls disposed adjacent said side walls of said housing.

12. A valve as defined claim 10 wherein said cutting elements comprise flat blades having cutting edges.

13. A valve as defined claim 10 wherein said diverter duct is supported for pivotal movement on an axis adjacent said fluid inlet, and said first strip cutting element is supported by said housing between said first fluid outlet and said second fluid outlet.

14. A valve as defined claim 10 wherein said diverter duct is pivotally supported on an axis adjacent said fluid inlet, and flexible sealing members connecting said diverter duct to said housing adjacent said fluid inlet.

15. A valve as defined claim 10 wherein said diverter duct has generally parallel spaced side walls and generally parallel spaced connector walls connecting said side walls to define a passage having a generally square cross-sectional configuration, said side walls and said connector walls define an outlet end for said diverter duct, and said set of cutting elements comprise a pair of inclined cutting blades mounted on said connector walls adjacent said outlet end of said diverter duct.

16. A valve as defined claim 15 wherein said tubular diverter duct has a pivot axis adjacent said fluid inlet, and said first cutting element comprises a cutting blade supported by said housing between said first and second fluid outlets.

17. A valve as defined claim 10 and including resilient stop members supported by said housing for alternating stopping said pivotal movement of said tubular diverter duct.

18. A diverter and chopper valve for a fluid conveyed continuous strip of material, comprising a housing having parallel spaced side walls connected by transverse walls, a fluid inlet and a first fluid outlet and a second fluid outlet within said transverse walls, said inlet adapted to receive a continuous flow of fluid conveying a continuous strip of material, a tubular diverter duct defining a passage having a generally square cross-sectional configuration and supported within said housing for pivotal movement on an axis adjacent said fluid inlet, said duct being pivotal between a first position directing the flow of fluid and continuous strip of material from said inlet to said first outlet and a second position directing the flow of fluid and the continuous strip of material from said inlet to said second outlet, a first strip cutting blade supported by said housing between said first and second fluid outlets, a set of second strip cutting blades mounted on an end portion of said diverter duct, said first and second cutting blades cooperate to cut the strip of material in response to pivoting of said diverter duct between said first position and said second position, and a fluid cylinder connected to move said diverter duct between said first and second positions.

19. A valve as defined claim 18 and including flexible sealing members connecting said diverter member to said housing adjacent said fluid inlet to direct the flow of fluid from said fluid inlet into said diverter duct.

20. A valve as defined claim 18 and including resilient stop members supported by brackets within said housing for alternating stopping movement of said tubular diverter duct and for restricting the flow of fluid within said housing.

\* \* \* \* \*